United States Patent Office 3,361,524
Patented Jan. 2, 1968

3,361,524
PRODUCTION OF PURE SODIUM METABISULFITE AND SODIUM SULFITE
Walter Spormann, Bad Durkheim, and Joachim Heinke, Ludwigshafen (Rhine), Germany, assignors to Badische Anilin- & Soda-Fabrik Aktiengesellschaft, Ludwigshafen (Rhine), Germany
No Drawing. Filed Mar. 24, 1964, Ser. No. 354,462
Claims priority, application Germany, Apr. 5, 1963, B 71,422
5 Claims. (Cl. 23—129)

ABSTRACT OF THE DISCLOSURE

Production of pure sodium metabisulfite and sodium sulfite by (a) reacting sulfur dioxide-containing gases with aqueous caustic soda solution at a pH of 3.8 to 4.5, (b) separating solid sodium metabisulfite from the mother liquor which still contains dissolved sodium metabisulfite, (c) admixing said mother liquor with additional caustic soda sufficient to provide a pH of at least 7.5 (preferably 8 to 11) and forming a suspension of sodium sulfite in the resultant, alkaline mother liquor, (d) separating the sodium sulfite crystals from the alkaline mother liquor which still contains dissolved sodium sulfite, (e) adding to the latter mother liquor with rapid mixing additional caustic soda of at least 55% (advantageously 65–75%) by weight concentration to provide a concentration of 40–50% by weight of free caustic soda to precipitate sodium sulfite in the latter mother liquor, advantageously at 60–100° C.; separating the precipitated sodium sulfiite; and using the resultant, alkaline mother liquor, e.g., by recycling, as part of the aqueous caustic soda solution described in step (a).

This invention relates to the production of pure sodium metabisulfite and sodium sulfite by reaction of sulfur dioxide or gases containing sulfur dioxide with caustic soda solution.

It is known that sodium metabisulfite ($Na_2S_2O_5$) and sodium sulfite ($Na_2SO_3$) can be prepared by reacting sulfur dioxide or gases containing sulfur dioxide, for example roaster gases, with aqueous solutions of sodium hydroxide. To avoid loss of sulfur dioxide, a common industrial procedure is to prepare the two compounds simultaneously in one plant in two stages. In the first stage, a maximum of about 50% by weight aqueous caustic soda solution is reacted with sulfur dioxide up to a pH of 3.8 to 4.5 and the deposited solid sodium metabisulfite is separated from its mother liquor. The mother liquor is neutralized in a second stage with further 50% by weight aqueous caustic soda solution up to a pH of at least 7.5, preferably 8 to 11. It is advantageous to add more caustic soda solution than is equivalent to the amount of metabisulfite mother liquor present. It is thus possible also to convert into sodium sulfite the sulfur dioxide content of the off-gas arising from the first stage by passing it through the caustic soda solution in the second stage. A suspension of solid sodium sulfite in the mother liquor is formed in the second stage, and as a rule no use can be found for the mother liquor. It is evaporated to recover further sulfite but this has the disadvantages that considerable amounts of energy must be used and that only a greatly contaminated sulfite is obtained because of oxidation. Evaporation costs may be lessened by starting from caustic soda solution having a higher concentration than 50%, but then there is the disadvantage that the metabisulfite and sulfite are formed in such a fine state of dispersion that it is very difficult to separate them from the mother liquors by means of conventional equipment, such as filters or centrifuges, so that continuous production is made practically impossible.

It is the object of the present invention to provide a process for the production of sodium metabisulfite and sodium sulfite by reaction in three stages of sulfur dioxide or gases containing sulfur dioxide with aqueous solutions of sodium hydroxide having a higher concentration than 50% by weight, which process does not have the above-mentioned disadvantages.

This object is achieved in the production of sodium metabisulfite and sodium sulfite in three stages by reaction of sulfur dioxide or gases containing sulfur dioxide with aqueous caustic soda solution in a first stage and separation of the sodium metabisulfite formed from the mother liquor, addition of further caustic soda solution to the mother liquor in a second stage and separating the solid sodium sulfite formed from its mother liquor, optionally while passing in off-gas containing sulfur dioxide leaving the first stage, and separation of the sodium sulfite which remains dissolved in the mother liquor by mixing the mother liquor containing sodium sulfite obtained in the second stage with an at least 55% by weight caustic soda solution in a third stage, separating the mother liquor from the deposited sodium sulfite and supplying the mother liquor to the first and/or second stage.

When the mother liquor obtained from the second stage of the process has added to it a caustic soda solution having a concentration of more than 55% by weight, the sulfite is surprisingly precipitated in the form of a finely crystalline salt provided the two solutions are mixed rapidly and intimately, for example by stirring. to achieve a salt which can be separated easily, it is advantageous to mix the solutions at a temperature above room temperature, for example, at temperatures of 60° to 100° C. The deposited salt may be separated without difficulty from its mother liquor by means of the usual separating means, for example filters or centrifuges. The mother liquor may then be processed in the conventional way into sodium metabisulfite and sodium sulfite by passing in sulfur dioxide or gases containing sulfur dioxide. Addition of caustic soda solution to the mother liquor is advantageously continued until the mother liquor contains about 40 to 50% by weight of free sodium hydroxide.

To remove any iron introduced into the process with the caustic soda, the suspension formed by mixing fresh caustic soda solution with the mother liquor from the second stage of the process is allowed to settle, the supernatant clear liquor is withdrawn and introduced, as described above, into the first and/or second stage of the process. The remaining mash, consisting of sodium sulfite suspended in about 50% caustic soda solution is neutralized with about 40% sodium metabisulfite solution which has been obtained in the first stage of the process until a pH of 7 to 10 is obtained. Ferric hydroxide is precipitated together with further sodium sulfite. After the solids have been separated, the pure solution is supplied to the first stage of the process. The sodium sulfite contaminated with iron may be used for many industrial purposes.

Caustic soda solutions having a concentration of more than 55% by weight may be used for the process; it is advantageous to use solutions having a concentration of about 65 to about 75% by weight.

The process according to this invention permits the production of sodium metabisulfite and sodium sulfite of high purity without the need for evaporating the mother liquor obtained in the second stage of the process to recover sodium sulfite dissolved therein and consequently without the oxidation of the sulfite associated with such evaporation.

The following example will further illustrate this invention.

Example 8 metric tons of a liquor containing about 4% by weight of soduim sulfite, 20% by weight of free caustic soda and 0.5% by weight of sodium sulfate is mixed with intense agitation in a vessel having a volume of about 20 cubic meters with such an amount of about 70% by weight caustic soda solution that the content of free NaOH in the solution reaches about 50% by weight, a temperature of about 80° C. being maintained. About 13 mertic tons of 70% caustic soda solution is used. 350 kg. of sodium sulfite is precipitated as a finely crystalline product which is separated from the mother liquor on a continuous centrifuge. The centrifuged salt is dried and then consists of about 93% by weight of sodium sulfite, 7% by weight of sodium sulfate and contains about 0.001% by weight of iron as impurity. The mother liquor, which consists substantially of 50% by weight caustic soda solution containing about 0.1% by weight of sodium sulfite and 0.1% by weight of sodium sulfate is supplied to the first process stage of a plant for the production of sodium metabisulfite and sodium sulfite. It is processed therein with roaster gases which contain about 8% by volume of sulfur dioxide. The sodium metabisulfite thus obtained is dried and then contains at least 99% of $Na_2S_2O_5$. The balance consists of water and sodium sulfate. The iron content is less than 0.001%. The mother liquor obtained in the first process stage, which contains about 40% by weight of sodium metabisulfite, has about 50% by weight caustic soda solution added to it in a second stage. Sodium sulfite is thus precipitated and is separated from the mother liquor. The sodium sulfite is dried and then contains at least 96% of $Na_2SO_3$. The remainder consists of sodium sulfate and water. The iron content is less than 0.005%. The mother liquor obtained is at least partly mixed again with fresh 70% by weight caustic soda solution as described above and, after the deposited sodium sulfite has been separated, again supplied to the first stage of the process.

We claim:

1. A continuous process for the production of substantially pure sodium metabisulfite and sodium sulfite which comprises reacting gases containing sulfur dioxide with aqueous caustic soda solution in a first stage at a pH of 3.8 to 4.5, separating the solid sodium metabisulfite formed from its mother liquor which still contains dissolved sodium metabisulfite, introducing said mother liquor into a second stage, admixing said mother liquor with further aqueous caustic soda solution sufficient to maintain a pH of at least 7.5, separating the suspended, solid sodium sulfite formed from the resultant, alkaline mother liquor, said mother liquor containing dissolved sodium sulfite, introducing the latter mother liquor into a third stage and admixing it with aqueous caustic soda solution having a concentration of 65 to 75% by weight while maintaining a temperature of 60 to 100° C. and a concentration of 40 to 50% by weight of free caustic soda in the mixture, separating the precipitated sodium sulfite and recycling the resultant liquor containing 40 to 50% by weight of sodium hydroxide to the first stage.

2. A process as claimed in claim 1, wherein the 65–75% aqueous caustic soda solution and said latter mother liquor in said third stage are mixed rapidly.

3. A process as claimed in claim 1, wherein a portion of the last-mentioned resultant liquor is recycled to said second stage as part of said further aqueous caustic solution.

4. A process as claimed in claim 1, wherein off gases of the sulfur dioxide containing gases of said first stage are introduced into said mother liquor of said second stage.

5. A process as claimed in claim 1, wherein said suspended, solid sodium sulfite in said second stage is separated by allowing it to settle, withdrawing the clear, supernant, alkaline mother liquor, recycling said supernant mother liquor to said first stage, neutralizing the mash remaining after withdrawal of said supernant liquor to a pH of 7–10 with said mother liquor of said first stage, thereby precipitating any iron in said liquor as ferric hydroxide along with sodium sulfite, separating the iron-contaminated, precipitated sodium sulfite from the resultant liquor, and recycling the latter liquor to said first stage.

References Cited

UNITED STATES PATENTS

| 1,642,535 | 9/1927 | Blumenberg | 23—129 X |
| 3,216,793 | 11/1965 | Spormann et al. | 23—129 |

FOREIGN PATENTS 1,072,229 10/1958 Germany.

MILTON WEISSMAN, *Primary Examiner.*

OSCAR R. VERTIZ, *Examiner.*

B. H. LEVENSON, *Assistant Examiner.*